Patented July 20, 1926.

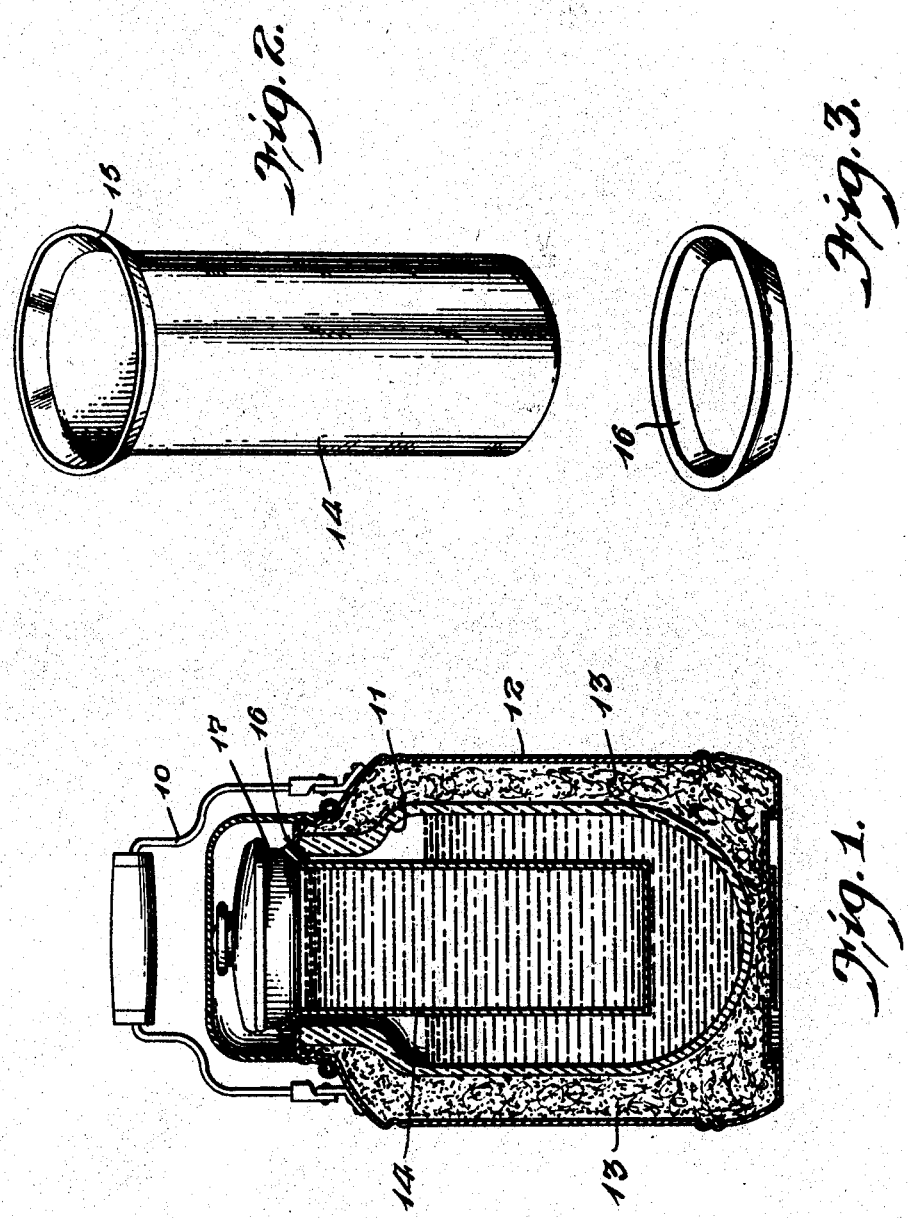

UNITED STATES PATENT OFFICE.

ARTHUR MARTIN SERAN, OF WEWOKA, OKLAHOMA.

HEAT-INSULATED VESSEL.

Application filed May 8, 1924. Serial No. 711,854.

My present invention relates to the well known type of vessels now in general use for the carrying and preservation of various articles and commodities whose hot or cold state it is desired to preserve, and more particularly to the jar type of insulated vessel justifying the carrying of different commodities whose mixture is to be avoided.

It is well known that such vessels of the jar type commonly of gallon or even greater capacity can now be used to hold but a single article of food and the like unless it be permitted to mix several such articles, and it is my object to provide such containers with simple inexpensive means whereby a second article may be held thereby without danger of mixing of the articles.

A still further object is to provide means whereby such vessels may be adapted to the cooking of certain articles, my invention proposing a holder in which the article to be cooked is placed within the cooking influence of a second material within the usual container.

Briefly my invention consists in an arrangement wherein the container, insulated from the jacket by either vacuum or non-vacuum means, is provided with an inner readily removable container which is closed with respect to the container when the usual vacuum or cork stopper of the latter is in place, so that two separate articles, fluid or otherwise, may be carried without danger of mixing and one article within the inner holder may be cooked by the heat of the other previously heated articles in the container around the holder.

In the accompanying drawing, illustrating my present invention and forming a part of this specification, Figure 1 is a vertical section through an insulated vessel showing the application of my invention thereto, Figure 2 is a perspective view of my improved holder, and Figure 3 is a similar view of the gasket ring.

Referring now to these figures, and particularly to Figure 1, I have shown a heat insulated vessel of the jar type adapted to be carried from place to place by means of a bail 10 and including a container 11 within and insulated from the jacket 12 to which the bail is attached. I have shown insulating material 13 between the container and jacket, but it is to be understood that a vacuum may be employed for insulating purposes. The container 11 has but a single compartment, as usual and my invention proposes a cylindrical holder 14 having a flanged rim 15 around its upper open end, the diameter of the holder being substantially less than that of the container 11 so that when disposed therein, an annular space remains around the holder which may be occupied by the contents of the container, especially where such contents are of a liquid nature.

The flanged rim 15 is adapted to rest upon the upper surrounding edge of the container or preferably upon a gasket ring 16, shown in Figure 3 and disposed on said edge, and thus when the stopper 17, of either vacuum nature or the more commonly used cork, is in place, firmly held by engagement of the closure cap 17 threaded on the upper neck portion of the jacket, it is obvious that the holder will be entirely closed with respect to the container.

Thus, with my improved holder in place, two different articles may be separately carried and preserved in either a hot or cold state, for instance tea and coffee, milk and water, and if so desired coffee may be placed within the container around the holder and the latter filled with an uncooked or partly cooked edible adapted to be cooked or its cooking completed by the heat of the coffee.

I claim:

A heat insulated vessel having a jacket, an inner casing forming therein a liquid container, the said container being insulated from and connected to the jacket and forming between the same and the jacket an insulating chamber, a stopper for the container, an inner cylindrical holder freely depending within the container and within the liquid thereof and removable therefrom, having around its upper open end a flange adapted to rest upon the upper edge of the inner casing or container, the said holder adapted to receive within its upper open end the said stopper, and a cap threaded on the jacket said cap engaging the stopper and constituting the sole means to hold the latter in position closing the holder and at the same time forcing the flange of the holder in closing relation against the upper edge of the container.

ARTHUR MARTIN SERAN.